(No Model.)
B. H. VELLINES.
CENTRIFUGAL SEPARATOR FOR NUTS, GRAIN, &c.
No. 466,730. Patented Jan. 5, 1892.
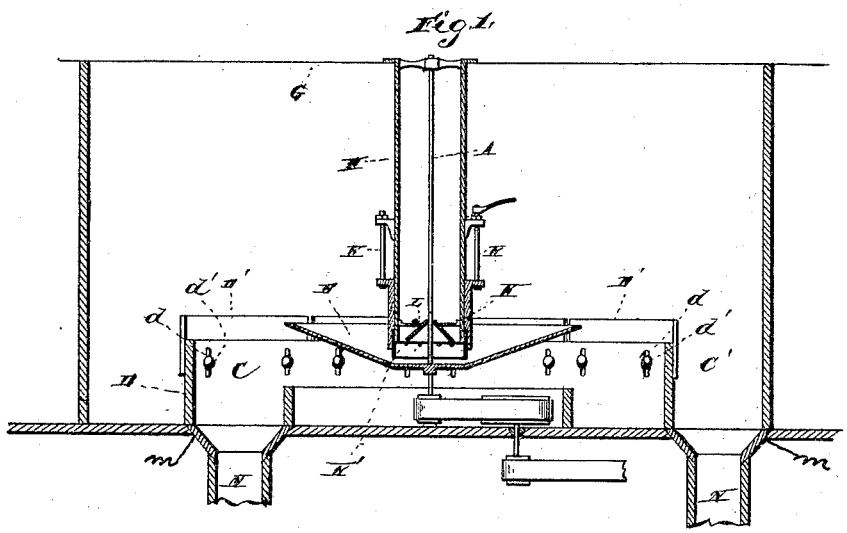
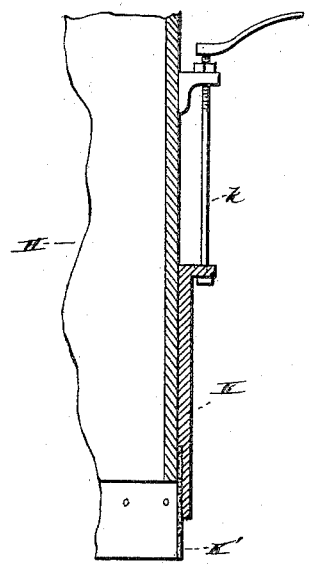
WITNESSES:
INVENTOR
Benton H. Vellines
BY E. W. Anderson
his ATTORNEY.

UNITED STATES PATENT OFFICE.

BENTON H. VELLINES, OF NORFOLK, VIRGINIA, ASSIGNOR TO THE NORFOLK, VIRGINIA, PEANUT COMPANY, OF SAME PLACE.

CENTRIFUGAL SEPARATOR FOR NUTS, GRAIN, &c.

SPECIFICATION forming part of Letters Patent No. 466,730, dated January 5, 1892.

Application filed May 21, 1891. Serial No. 393,609. (No model.)

*To all whom it may concern:*

Be it known that I, BENTON HARPER VELLINES, a citizen of the United States, and a resident of Norfolk, in the county of Norfolk and State of Virginia, have invented certain new and useful Improvements in Centrifugal Separators for Nuts, Grain, &c.; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a vertical central section. Fig. 2 is a sectional detail of central feed-shoe.

The object of this invention is to provide a machine for separating nuts and grain by centrifugal action into grades or to separate them from débris and light extraneous matter; and the invention consists in the novel combination and construction of devices, all as hereinafter set forth.

In the accompanying drawings, the letter A designates a central upright shaft which supports a large circular disk or basin B, which is usually somewhat concave or dished, as indicated, and designed to be rotated at a high rate of speed or according to the work to be performed. This basin may be secured to the shaft and rotated therewith, a pulley being applied to said shaft at its upper or lower end; or it may rotate about the shaft, the pulley being attached to the basin. The former construction is preferred. The basin is located at a height upon the shaft sufficient to allow the nuts flying outward from its edge to fall into the circular compartments C C' around it, these compartments being separated by means of a circular partition D, the upper edge of which is at a lower level than the basin. The basin is preferably adjustable upon the shaft, in order that its height may be varied according to the requirement of the work. Usually the body of the shaft is squared at the bearing portion, and set-screws through the hub of the basin may be employed to secure it in position.

The outer wall of the outer circular compartment C' is of sufficient height to prevent any of the stock which flies over the edge of the partition D from escaping from said compartment. The bad nuts and stuff of lighter specific gravity are designed to fall more directly into the inner circular compartment C, whose outer wall is the partition D, the height of which may be varied by means of the adjustable edge sections or flanges D', which may be raised or lowered according to the requirement of the separation and secured in position after adjustment. For this purpose the partition may be provided with vertical slots, as at $d$, and with clamp-screws $d'$ passing through said slots and through bearings in the sections D'.

The nuts or grain to be worked upon are fed through an opening F in the floor or platform G above the basin and pass down through a feeding cylinder or chute H, which is secured to said floor or platform and extends to within a short distance of the central portion of the basin. Around its lower end is an adjustable sleeve K, which may be attached to legs of the cylinder by adjusting-screws $k$, and said sleeve is provided with a feeding-apron $k'$ of rubber which forms its lower edge or feeding-lip and serves to prevent harsh action or grinding as the stock escapes out from under the apron. Should the grinding action of the basin at the bottom of the feed-cylinder be found too harsh for delicate or fine stock, a protector plate or cone L may be introduced above the central portion of the basin within the cylinder, this protector being secured by arms to the cylinder-wall.

The operation is as follows: The nuts being fed from the upper floor or platform into the cylinder or chute are carried out under the apron by the revolving basin and are thrown outward by the latter in its rapid revolutions over its edge, the good or heavy stock flying over the partition D into the compartment C' and the light stuff falling into the compartment C. These compartments are usually provided with openings $m$ through their floors, and with discharge-chutes N extending downward therefrom, through which the good and bad nuts as graded can be discharged into receptacles below.

Having described this invention, what I claim as new, and desire to secure by Letters Patent, is—

1. A centrifugal separator having a rotary circular basin, a series of concentric circular compartments located around and below the periphery of said basin, the outer wall of the inner compartment having secured to its upper edge a series of segment-like sections vertically adjustable with relation thereto, a vertical feed-chute or cylinder above said basin and terminating within a short distance thereof, and a sleeve adjustably secured around the lower edge of said chute, said sleeve having an elastic apron forming its lower or feeding edge, substantially as specified.

2. The combination, with the feed cylinder and chute, of a sleeve adjustably held around the lower portion of the rubber apron $k$, forming its lower edge or feeding-lip, and a protector plate or cone within said cylinder and secured thereto, substantially as specified.

In testimony whereof I affix my signature in presence of two witnesses.

BENTON H. VELLINES.

Witnesses:
D. S. BENNETT,
W. J. SMITH.